(12) United States Patent
Bishop (10) Patent No.: US 6,945,353 B2
(45) Date of Patent: Sep. 20, 2005

(54) VARIABLE RATIO STEERING GEAR

(75) Inventor: Arthur Ernest Bishop, Greenwich (AU)

(73) Assignee: Bishop Steering Technology Limited, North Ryde (AU)

( * ) Notice: Subject to any disclaimer, the term of this patent is extended or adjusted under 35 U.S.C. 154(b) by 0 days.

(21) Appl. No.: 10/415,573

(22) PCT Filed: Oct. 30, 2001

(86) PCT No.: PCT/AU01/01399

§ 371 (c)(1),
(2), (4) Date: Jul. 1, 2003

(87) PCT Pub. No.: WO02/36410

PCT Pub. Date: May 10, 2002

(65) Prior Publication Data

US 2004/0040779 A1 Mar. 4, 2004

(30) Foreign Application Priority Data

Nov. 1, 2000 (AU) .............................. PR 1148

(51) Int. Cl.[7] .................................. B62D 5/04
(52) U.S. Cl. ..................................... 180/446
(58) Field of Search ................. 180/446, 443, 180/444; 701/41; 74/388 PS, 497

(56) References Cited

U.S. PATENT DOCUMENTS

| | | | |
|---|---|---|---|
| 2,508,057 A | 5/1950 | Bishop | |
| 2,682,311 A | 6/1954 | Bishop | |
| 2,865,215 A | 12/1958 | Bishop | |
| 5,362,080 A | * 11/1994 | Bishop et al. | ............... 180/415 |
| 5,482,130 A | 1/1996 | Shimizu | |
| 5,489,004 A | 2/1996 | Shimizu et al. | |
| 6,155,377 A | * 12/2000 | Tokunaga et al. | ........... 180/446 |
| 6,374,693 B1 | * 4/2002 | Kawabe et al. | ................ 74/499 |

FOREIGN PATENT DOCUMENTS

| | | |
|---|---|---|
| DE | 19956713 A1 | 6/2000 |
| EP | 0 927 678 A1 | 7/1999 |
| JP | 60-131366 A | 7/1985 |

OTHER PUBLICATIONS

SAE International, SAE Technical Paper Series, 1999–01–0395, "Improvement in Driver–Vehicle System Performance by Varying Steering Gain with Vehicle Speed and Steering Angle: VGS etc.," Shimizu et al., Intl. Congress and Exposition, Mar. 1–4, 1999.
Derwent Abstract Accession No. 2000–266015/23, Class Q22, X22, JP 2000072014 A, Mar. 7, 2000.
Derwent Abstract Accession No. 97–174914/16, Class Q22, JP 09039822 A, Feb. 10, 1997.

* cited by examiner

*Primary Examiner*—Tony Winner
(74) *Attorney, Agent, or Firm*—Birch, Stewart, Kolasch & Birch, LLP (57) ABSTRACT

A rack (1) and pinion (4) steering gear for a vehicle in which the steering angle ratio varies as a function of at least both the steering wheel angle input by the driver and vehicle speed. The steering gear comprising a rack (1) laterally displacable with respect to a steering gear housing and a pinion (4) laterally movable within the housing substantially in a direction of travel of the rack (1) whilst engaged with the rack (1). The steering angle ratio is increased in a central region of travel of the rack (1) when compared to regions either side thereof, and steering angle ratio is further increased in the central region as vehicle speed increases.

20 Claims, 10 Drawing Sheets

VARIABLE RATIO STEERING GEAR

This application is the national phase under 35 U.S.C. § 371 of PCT International Application No. PCT/AU01/01399 which has an International filing date of Oct. 30, 2001, which designated the United States of America.

TECHNICAL FIELD

The present invention relates to a Variable Ratio Steering Gear in which the ratio between the driver's control device and the road wheels varies firstly in accordance with vehicle speed and secondly in accordance with the angle of turn from centre of the road wheels. More particularly the invention is directed towards a Variable Ratio Steering Gear in which the ratio between the amplitude of the driver's input to the control device and the turning of the road wheels(hereinafter referred to as the steering ratio) increases within a central region of the rack and further increases the central region of the rack as vehicle speed increases.

BACKGROUND

Various devices have been described in the literature and patents which seek to accomplish the above objectives based on electronic devices which do not employ any direct mechanical connection between the driver's control device, whether a steering wheel or a "joy stick" or the like.

There is concern, however, at the absolute reliability of such devices and has been proposed that one or even two additional electronic systems be used to provide system redundancy to lessen the possibility of a major malfunction occurring. Alternatively, it has been proposed that a mechanical connection also be provided between the driver's control device and the road wheels which would take over in the event of a major malfunction of the electronic device.

A problem arises, however, in having a mechanical back-up device reasonably mimic the performance of the electronic device, so that, if a transition to mechanical from electronic operation occurred at high speed or in a corner, the driver has the best chance of retaining control of the vehicle.

Consideration must also be given to the appropriate ratio pattern relating the angle of turn of the road wheels to the steering wheel. Only certain mechanical linkages are suitable to perform this function, one of which is the well-known Geneva Pin and Slot device the use of which is described below. An alternative design using a cam mechanism is also described.

Practical means of providing the correct force levels (that is "feel") at the steering wheel rim are required in both the mechanical and electronic devices.

It is now accepted that power assistance is provided in the steering systems of all but the smallest cars, and that electric power assist will replace hydraulic assist in many cases.

JP Patent publication no. 60131366A in the name of Fuji Heavy Industries Limited discloses a variable ratio steering gear in which the ratio between the driver's control device and the road wheels varies firstly in accordance with vehicle speed and secondly in accordance with the angle of turn from centre of the road wheels. However, the steering gear described in this reference is only for a manual steering gear in which the steering gear ratio is reduced over the central region of the rack by utilising a linkage means which creates movement of the pinion and housing simultaneously. The linkage means utilised results in further reduction of the steering gear ratio over the central region of the rack as vehicle speed increases. Such a device is not suited for use on a power assisted steering gear and is an undesirable arrangement in that the signal to increase the output near centre is derived from the modified output and not the input.

The following description relates to the appropriate mechanical construction which is suited to both hydraulic and electric power steering, both of which are based, according to the invention, on substantially the same construction.

Provision is also made within these mechanisms to provide supplemental steering inputs which may be derived from electronic devices, but according to the preferred embodiment such inputs will be very limited in extent so that even if they malfunction the effect on the driver's control will be minimal.

SUMMARY OF THE INVENTION

In a first aspect the present invention consists in a rack and pinion steering gear for a vehicle in which the steering angle ratio varies as a function of at least both the steering wheel angle input provided by the driver and vehicle speed, said steering gear comprising a rack laterally displaceable with respect to a steering gear housing, characterised in that said steering gear further comprises a pinion laterally moveable within said housing substantially in a direction of travel of said rack whilst engaged with said rack, and said steering angle ratio is increased in a central region of travel of said rack when compared to regions either side thereof, and said steering angle ratio is further increased in said central region as vehicle speed increases.

Preferably said pinion is journalled for rotation within a pinion housing laterally movable within said steering gear housing substantially in the direction of travel of said rack, so subtracting from the travel of said rack and so minimising the travel ratio therebetween by a variable amount, said amount decreasing with rotation of the pinion from the centre straight ahead position and also decreasing with the speed of the vehicle.

Preferably said rack and pinion steering gear has a first mechanical linkage means connected to said pinion to move said pinion in said steering gear housing in accordance with a predetermined transmission pattern operable in said central region of travel of said rack and disconnected therefrom in said regions either side thereof, and a second mechanical linkage means connected to said first mechanical linkage means adapted to multiply said transmission pattern as a function of vehicle speed to further increase said steering angle ratio in said central region.

Preferably said rack and pinion steering gear includes a by-pass means connected to said second mechanical linkage means adapted to limit loads transmitted through said first and second mechanical linkage means when the load being transmitted from the pinion to the rack or vice versa exceeds a predetermined value, said loads thereafter being carried solely by said rack and said pinion.

Preferably said bypass means comprises a detent mechanism connected to said housing.

In a first embodiment said first said mechanical linkage means comprises a Geneva mechanism, having a first shaft rotatable with said pinion carrying a first pin offset from the axis of said first shaft, said first pin operarable to engage a first radial slot in a member carried by a second shaft whose axis is parallel with and offset from the axis of the first shaft, a second radial slot in said member rotatable with said second shaft, and a second pin engaged in said second slot, fixed laterally with respect to said housing at a distance with respect to the axis of said second shaft variable in accordance with vehicle speed.

Preferably said first embodiment comprising a lever pivoted with respect to said housing, said second pin being secured to said lever.

Preferably said vehicle includes a detection means for detecting the departure of the vehicle from the directional course as indicated by the driver's position of the steering wheel and in respect to the vehicle speed, said detection means providing an output signal to an actuator means in order to move said second pin laterally in said housing in response said output signal.

In a second embodiment said first mechanical linkage means comprises a pair of desmodromic cams.

In a second aspect the present invention consists in a rack and pinion steering gear for controlling the road wheel steering angle of a vehicle as a function of at least the steering wheel angle input provided by the driver and vehicle speed, the steering gear comprising a rack laterally displaceable in a fixed rack housing, and a pinion journalled for rotation in a pinion housing, the displacement of the rack in the rack housing determining the road wheel angle and the rotation of the pinion in the pinion housing determined by the steering wheel angle, the instantaneous ratio between changes in steering wheel angle and changes in road wheel angle defining a steering ratio characteristic which varies as a function of steering wheel angle and vehicle speed, wherein the pinion housing is journalled for lateral displacement relative to the rack housing, and an actuation means determines the lateral displacement of the pinion housing relative to the rack housing as a function of the magnitude of at least steering wheel angle and vehicle speed, thereby determining the steering ratio characteristic.

Preferably the actuation means comprises a mechanical linkage, such that, when displacement inputs relating to the magnitude of steering wheel angle and vehicle speed are applied to said linkage, and said linkage has a kinematic characteristic output to the rack which therefore varies with the magnitude of said displacement inputs.

Preferably one or both of the displacement inputs are provided by an electric or hydraulic actuator.

In a first embodiment the mechanical linkage means comprises a pin-and-slot mechanism.

In a second embodiment the mechanical linkage means comprises a cam-and-follower mechanism.

Preferably the mechanical linkage comprises a spring loaded element which provides compliance to the linkage during high load conditions, and thereby protecting the mechanism from damage during these conditions.

Preferably the actuation means determines the lateral displacement of the pinion housing relative to the rack housing also as a function of an additional input which is independent of the steering wheel angle input provided by the driver.

Preferably the actuation means is a hydraulic or electric actuator.

Preferably the steering ratio characteristic provides a steering ratio in the centre operating region of the steering gear associated with on-centre driving which is greater, by a given maximum increment, than the steering ratio provided in the other operating regions of the steering gear either side of this centre operating region.

Preferably the increment is larger in magnitude for higher vehicle speeds.

Preferably the increment is zero or negative for low vehicle speeds.

According to the present invention, at least two mechanical devices are used in series to provide as close as possible to the idealised steering ratio characteristic throughout the very wide range of force levels and sensitivity which typically occur in vehicle steering. It is preferred that the use of the steering wheel is retained In one aspect of the present invention the steering control movements are dealt with as occurring within three separate regions, a centre region, where the sensitivity changes both in accordance with vehicle speed and also in accordance with the angle of turn of the control device. This relationship results from the well-known principle that the lateral acceleration (which is limited in practice by the adhesion of the tyre to the road) varies as the inverse of the radius of turn and the square of the speed. The turn radius is largely determined by the angle of the front tyres to the road and hence the steering wheel angle. This regime dominates the steering at speeds of above about 30 kph, but only requires a turn of the front wheels of about $\frac{1}{5}^{th}$ of the angle of turn to the limit stopping angle occasionally used in low speed corner in and parking. In remaining four fifths of turning of the front wheels, the appropriate steering ratio is typically selected so that the steering effort will not be excessive in the event that the power assist system fails, and this usually calls for a steering ratio of about 10 or 12 to 1.

Preferably, in accordance with the invention, the control in the centre region employs a Geneva principle, which provides a characteristic plot of steering ratio versus turn of the steering wheel close to that needed to achieve a linear relationship between the angle of rotation of the steering wheel and the yaw rate of the vehicle when the vehicle is operated at limit speeds typical of the radius of turn corresponding that that angle of rotation. The plot is sometimes termed the bell curve. It is preferred that the Geneva arrangement is such that the pin lies between the two axes of the Geneva movement and not outside therefore as shown in the U.S. Pat. Nos. 5,489,004 and 5,482,130 assigned to Honda and described in the SAE paper 1999-01-0395; "Improvements in Driver-Vehicle System Performance by Varying Steering Gain with Vehicle Speed and Steering Angle". Also in Bishops Patents 2,508,057, 2,682,311 and 2,865,215 (the first two Bishop Patents relate to aircraft nosegear steering, and the latter Patent to Automotive Power Steering).

In this later arrangement of this mechanism where the pin lies outside the two axes, there is difficulty in providing an adequate high steering ratio on-centre and, at the same time, avoiding an undesirably low ratio towards the lock. Furthermore, there is difficulty in designing the system to carry the very high test loads which, according to automotive specifications, a steering system must be able to carry.

According to the present invention, a conventional rack and pinion steering gear is used in combination with a side-shifting pinion. It is fortuitous that the necessary amount of side-shift of the pinion of a steering system made according to the teachings of the invention is very small, and the linking of the steering gear input shaft to the driver's steering shaft can readily be accommodated in a simple coupling device.

This steering system provides modulation of steering sensitivity when the vehicle is travelling straight ahead or in a turn without reliance on sensitivity reduction suspension devices of a type which incur a lagging response to driver input. This also allows a significant reduction in the angle of turn of the steering wheel in normal cornering, improving the capability of a driver to make a swift turn of the steering wheel in the case of imminence of a skid.

Three regimes are provided, the centre as described above and the two side regions so that the ideal ratio can be chosen in all three areas of operation. The very high loads to which the steering gear may occasionally be exposed can be bypassed from affecting the sensitive ratio changing device in the narrow centre region, in which event the steering gear momentarily reverts to a conventional power rack and pinion steering which can readily accommodate such excess loading.

The side-shifting of the pinion is so arranged that it subtracts from the output of the rack and pinion and can quite readily be made so as to provide a centre steering ratio of any magnitude that may be required.

MODE OF CARRYING OUT THE INVENTION

Figure 1:
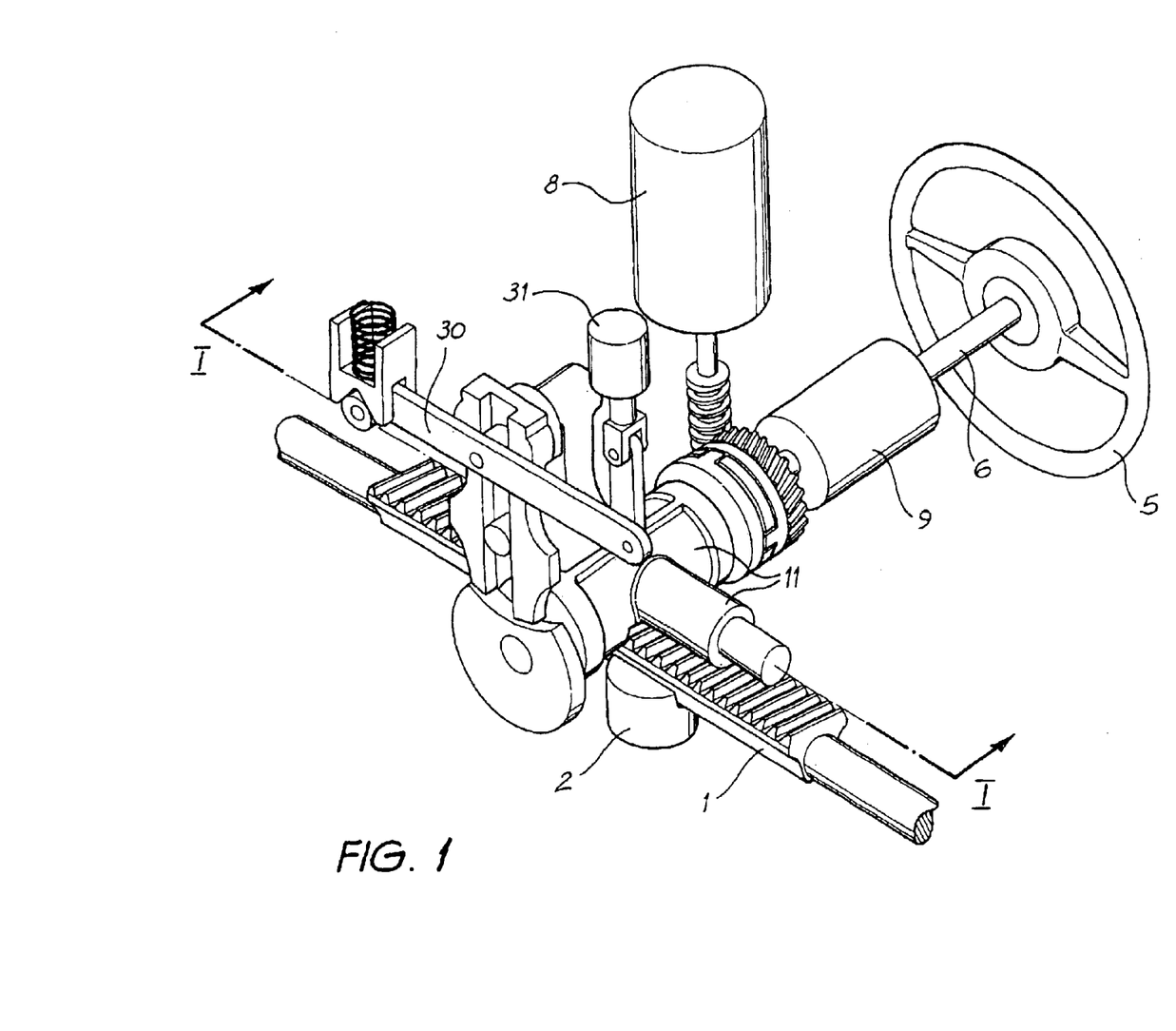
FIG. 1 is a perspective view of a rack and pinion steering gear for a vehicle in accordance with a first embodiment of the present invention.
Figure 2:
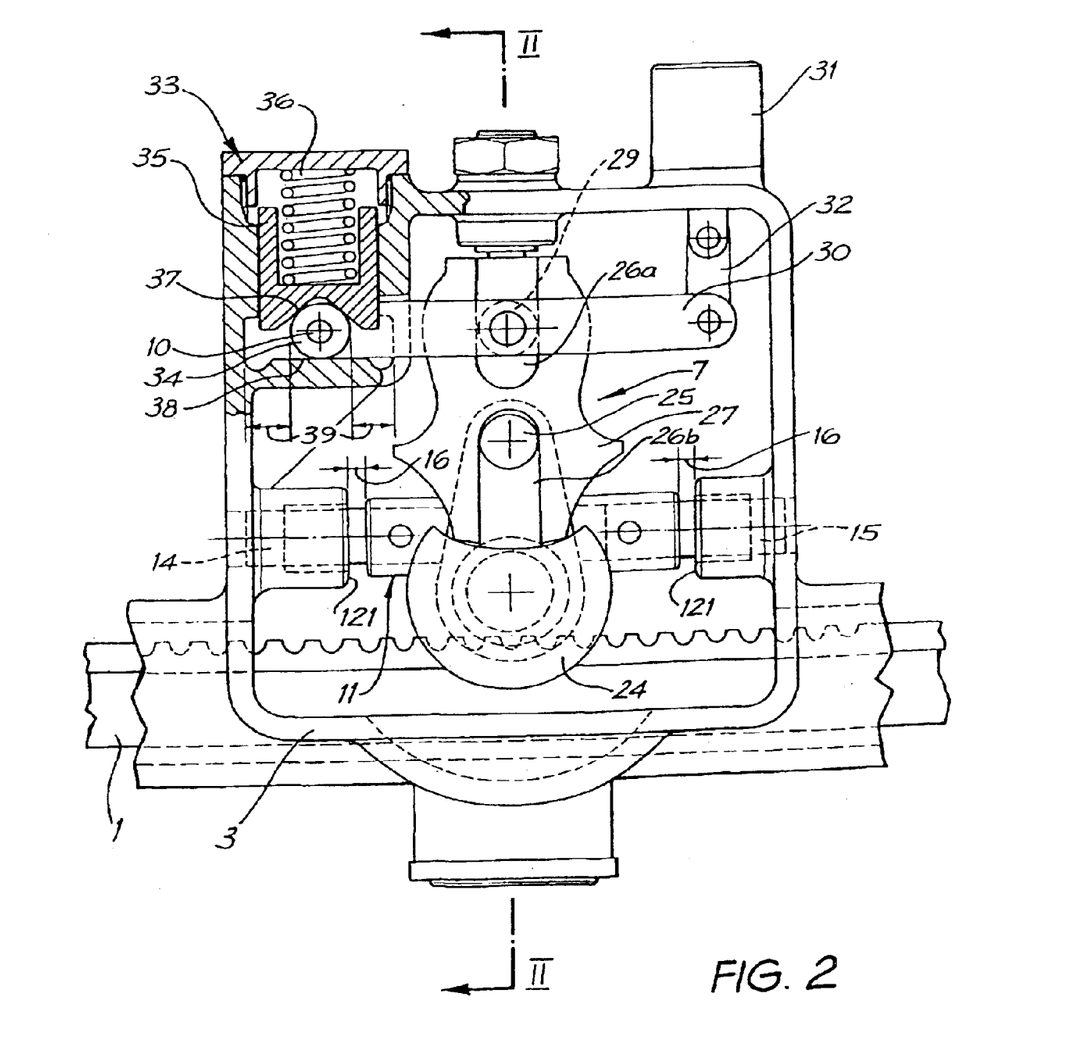
FIG. 2 is a cross sectional view through section I—I of FIG. 1
Figure 3:
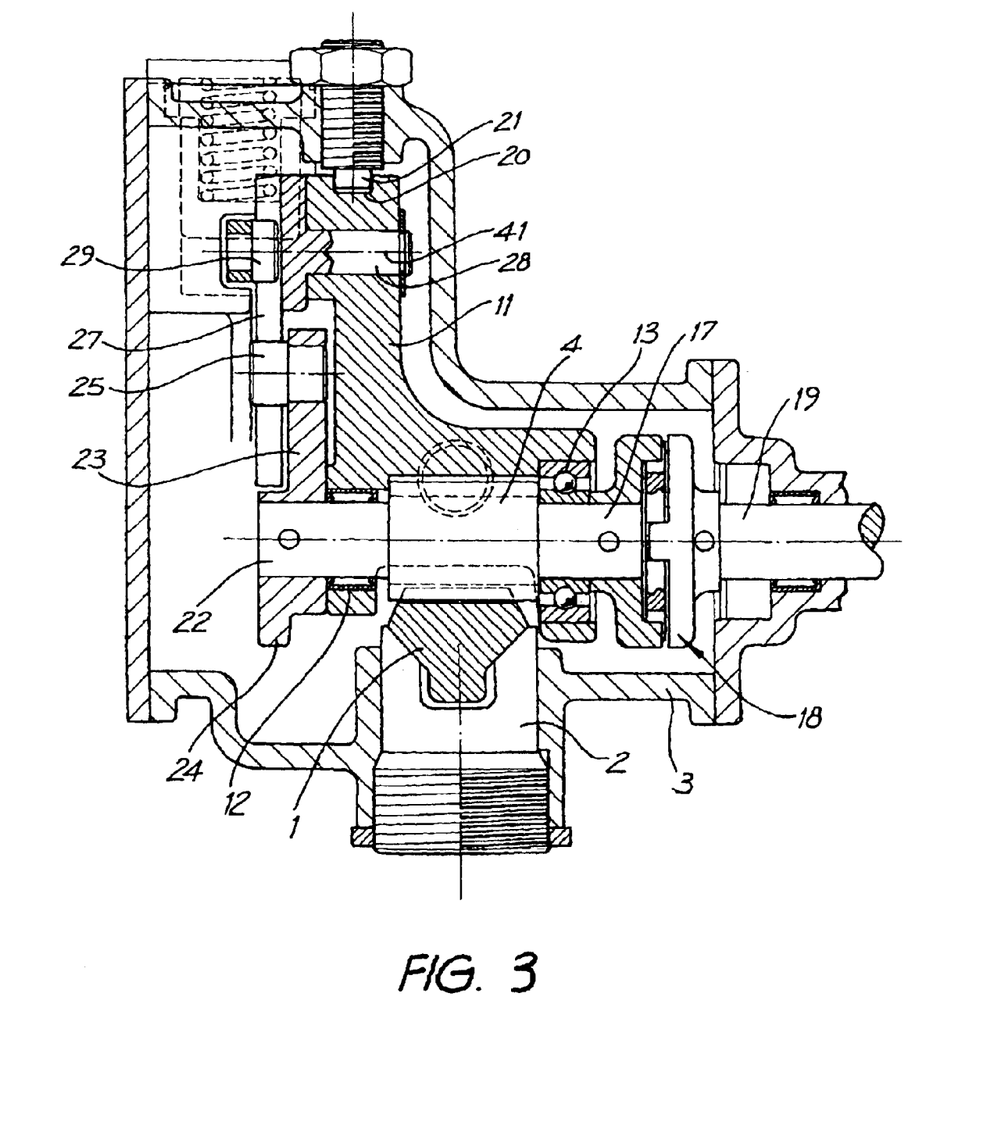
FIG. 3. is a cross sectional view through section II—II of FIG. 2

FIGS. 1, 2 and 3 show the general arrangement of the main components of one configuration of a first embodiment of the steering gear made according to the invention.

Rack 1 and pinion 4 are constructed according to the widely accepted arrangement employed in rack and pinion steering gears. Tie rods (not shown) are connected to each end of the rack and are pivoted to steering arms extending rearwardly or forwardly from the pivoted front wheels of the vehicle. Rack 1 slides in rack guide 2, incorporated in housing 3 (FIGS. 2 and 3) at one side of the vehicle and in a journal (not shown) on the opposite side of the vehicle. Pinion 4 engages rack 1 in the conventional manner and is connected to rotate with steering wheel 5 by steering column 6.

In the form of steering gear to be described, electric motor driven power assistance is provided from electric motor 8. The operation of motor 8 is controlled by torque sensing device 9. Alternatively, hydraulic power-assist may be provided by employing a rotary valve system in place of torque transducer and a cylinder and piston on an extension of rack 1 in the conventional manner.

In conventional power steering, pinion 4 is journalled in the steering gear housing whereas according to the invention, and as shown in FIGS. 2 and 3, it is journalled in pinion-carrier 11 by bearings 12 and 13. Pinion carrier 11 is arranged to slide laterally in housing 3 on guide rods 14 and 15 in the direction of the axis of rack 1, or at some angle with respect thereto as required for convenient installation in the vehicle. Travel of pinion carrier 11 is limited by the clearance 16 on each side thereof with respect to abutments 121 provided in housing 3.

A pinion shaft as at 17 extends from pinion 4, on which is mounted one component of an oldham coupling 18. The other component of oldham coupling 18 being mounted on input-shaft 19 rotatably connected to steering column 6 via torque sensor 9. By this means, a slack-free connection is provided between shafts 17 and 19 which can accommodate the small lateral movement of the pinion carrier 11.

Pinion carrier 11 is restrained from rotation about the axis of guide rods 14 and 15 by a guide slot 20 formed in the upper portion of pinion carrier 11 which engages a guide pin 21 fixed within housing 3. Alternatively, in a not shown embodiment, a roller-bearing slideway may be provided within housing 3 to allow lateral movement in a low friction manner, at the same time providing against rotation of pinion carrier 11.

Pinion 4 has a shaft 22 extending downwardly within the steering gear, beyond bearing 12 as and has rigidly fixed thereto, a geneva mechanism 7 which includes geneva pin drive plate 23, locking plate sector 24, geneva drive pin 25 and geneva driven plate 27.

Geneva drive pin 25 engages a lower slot 26b, formed in geneva-driven plate 27, which incorporates a driven plate shaft 28 journalled in pinion carrier 11 about axis 41.

Figure 8:
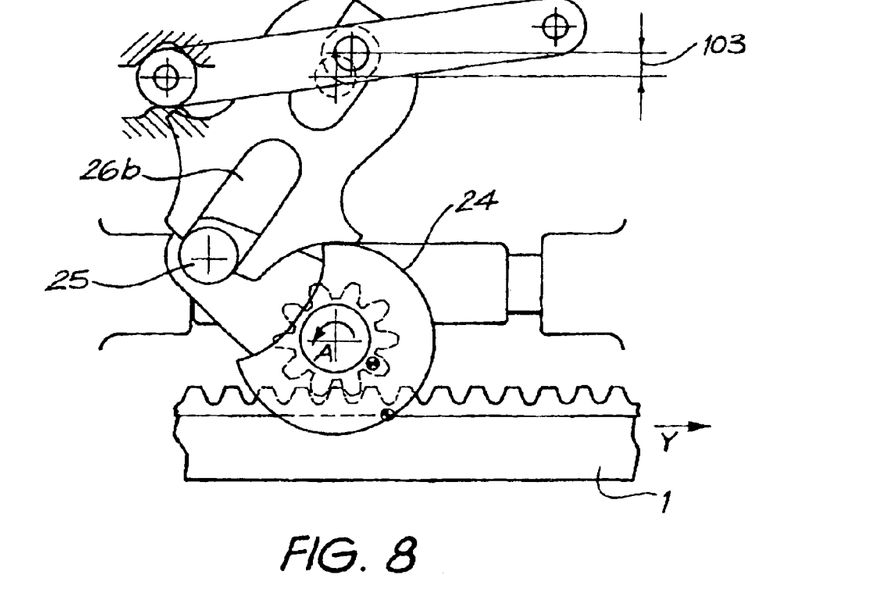

Rotation of geneva pin drive plate 23 causes driven plate 27 to rotate in the familiar manner of the geneva mechanism until a point is reached where pin 25 leaves slot 26b as illustrated in FIG. 8 as described subsequently. Pin 29 is secured to speed lever 30 and engages with upper slot 26a, formed in geneva-driven plate 27.

A servo-motor actuator 31 is connected to one end of link 32 which in turn is connected to speed lever 30. Actuator 31 causes link 32 to be displaced upwardly and inclines speed lever 30 in response to a signal received from the vehicle's electronic control unit ECU or a separate vehicle speed sensing device (not shown).

The opposite end of speed lever 30 extends to a detent device 33 which includes spring 36, plunger 35 with V-notch 37, an abutment 38 and roller 34 journalled on pin 10 secured to speed lever 30. Roller 34 rolls freely on abutment 38. Restricting the free movement of roller 34 is spring loaded plunger 35 which is loaded downwardly by spring 36 and has at its lower extremity V-notch 37. The roller is limited in its lateral travel distance shown as 39, and it is arranged such that travel distance 39 exceeds the clearance 16 at either side of pinion carrier within housing 3.

Figure 4:
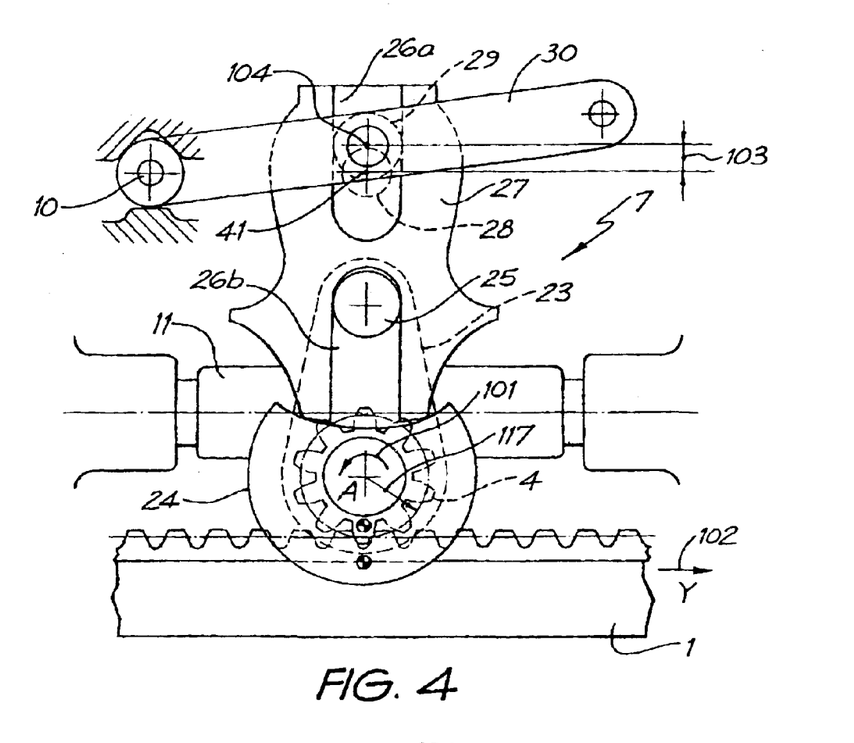
FIG. 4. is an enlarged simplified view of FIG. 2 showing a geneva mechanism portion of the first embodiment.

FIG. 4 shows a simplified view of the steering gear shown in FIG. 2 with only the components shown that are necessary to describe how the steering angle ratio varies as a function of both steering wheel angle 101 and vehicle speed.

Vertical distance 103 is the distance between axis 41 and the axis of pin 104 which journals roller 29. Pin 104 is secured to speed lever 30. Distance 103 is varied by inclination of speed lever 30 which is achieved by actuating actuator 31. At a high vehicle speed, distance 103 is greater than at a low vehicle speed.

It should be readily understood that in another not shown embodiment, upper and lower slots 26a, 26b in driven plate 27, can be extended to form a single slot in which both pins 25 and 29 engage.

Figure 5:
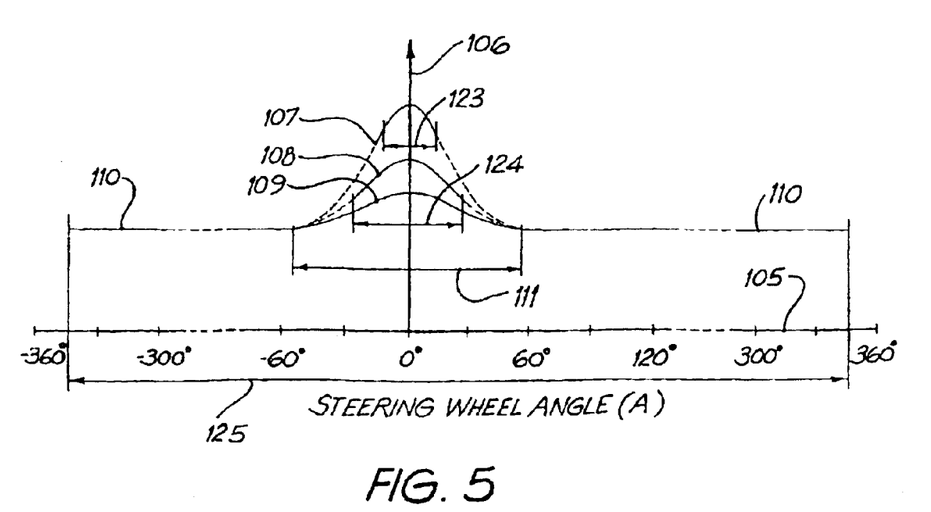
FIG. 5 is a graph of steering angle ratio vs steering wheel angle achieved by the first embodiment shown in FIG. 1.

FIG. 5 shows three example "steering angle ratio" characteristic curves for the mechanism shown in FIG. 4. Horizontal graph axis 105 on FIG. 5 represents steering wheel angle, shown as arrow 101, on FIG. 4. Vertical graph axis 106 represents steering angle ratio. Curves 107, 108 and 109 are example characteristics at various vehicle speeds. Curve 107 is the steering angle ratio characteristic at high speed as a result of distance 103 being at its maximum design position. Curve 109 is the steering angle ratio characteristic at a low speed as a result of distance 103 being at its minimum design position. Curve 108 is the steering angle ratio characteristic at a medium speed as a result of distance 103 being near its middle design position. All curves are symmetrical. There are an infinite number of curves possible between curves 107 and 109.

Under normal driving conditions the higher the vehicle speed the less steering wheel angle range is used. For example steering angle range 123 on curve 107 would be typical at high vehicle speed. Steering angle range 124 on curve 108 would be typical at medium speed. Steering angle range 125 on curve 109 would be typical at low speed.

Region 111 represents the central region of rack 1 over which geneva mechanism 7 is operable. Outside of the central region 111, curves 107, 108 and 109 all are identical and are represented by constant steering angle ratio regions 110 on either side of central region 111. Within central region 111 the steering angle ratio is always higher at higher vehicle speed. The steering angle ratio changes smoothly in a bell shaped curve with the maximum steering angle ratio at the straight ahead driving position, which in the graph of FIG. 5 is depicted as the 0° steering wheel angle on the horizontal axis 105.

The nature of the bell curves spanning the central region 111, as represented by curves 107, 108 and 109, are generated as a result of the design of geneva mechanism 7, which creates a "predetermined transmission pattern" between the steering wheel angle and the small lateral movement of pinion carrier 11.

FIGS. 6, 7, 8 and 9 show the simplified steering gear of FIG. 4 at four different steering wheel angles 101, respectively. FIGS. 6, 7, 8 and 9 are at the same vehicle speed and as such all have the same distance 103. In this example distance 103 is for high speed and the steering angle ratio characteristic is curve 107.

Figure 9:
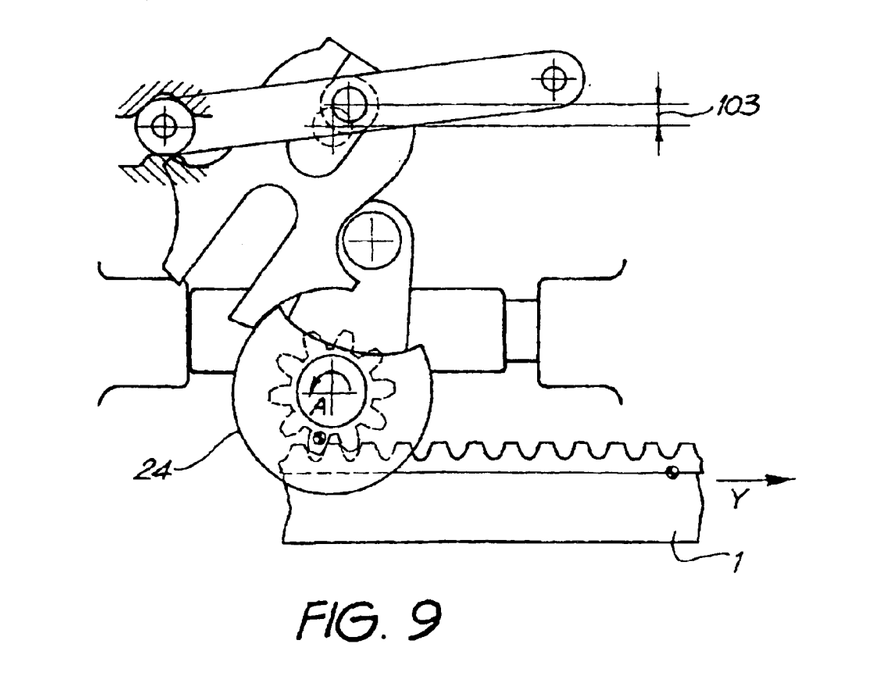
Figure 10:
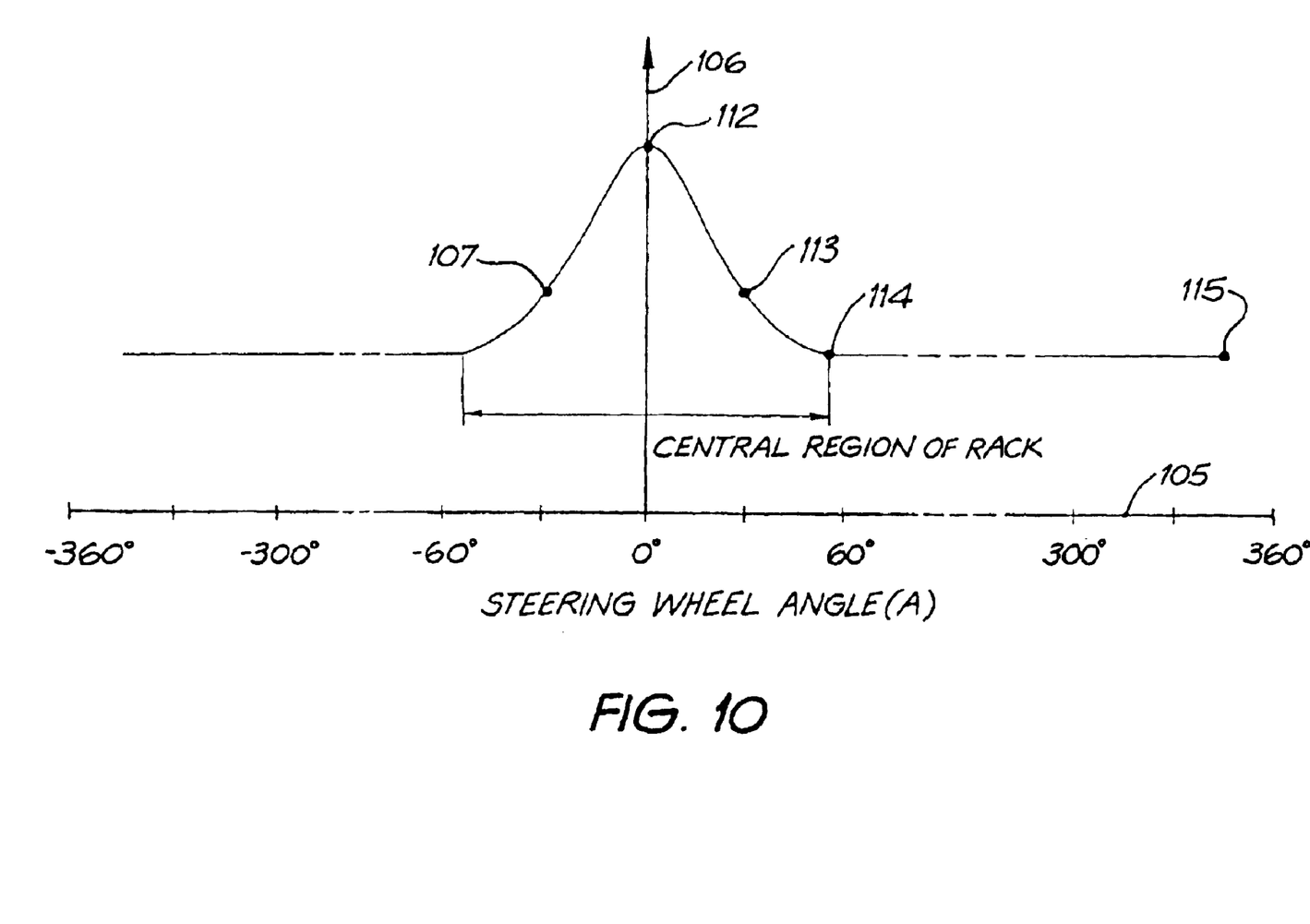
FIG. 10 is a graph depicting a single high speed curve from FIG. 5.

FIG. 10 is high speed steering angle ratio characteristic curve 107 showing the points on the curve corresponding to the different steering wheel angles of FIGS. 6, 7, 8 and 9. Point 112 on curve 107 is the steering angle ratio for the position of the steering gear shown in FIG. 6. Likewise, point 113 corresponds to FIG. 7, point 114 corresponds to FIG. 8, and point 115 corresponds to FIG. 9.

Figure 6:
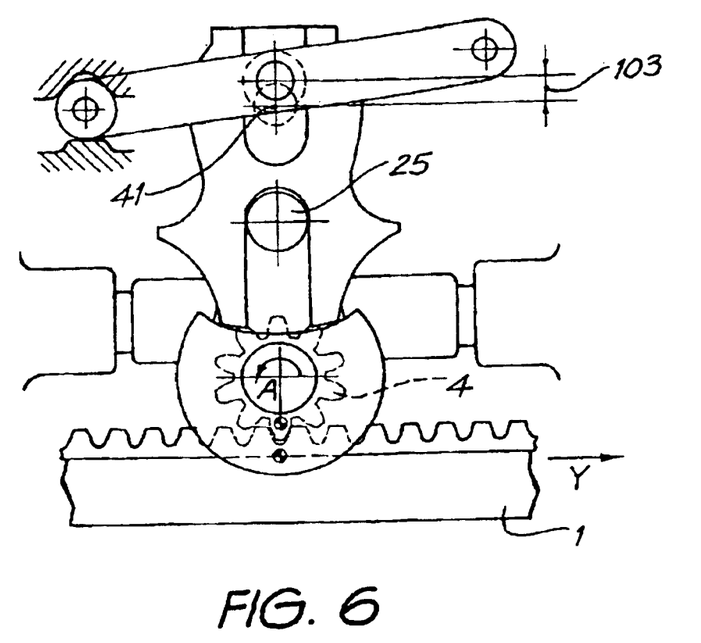
FIGS. 6–9 depict various positions of the geneva mechanism shown in FIG. 4.

FIG. 6 shows the steering gear in the straight ahead driving position where the steering wheel angle 101 is 0° and geneva pin 25 is in line with axis 41 and pinion 4.

Figure 7:
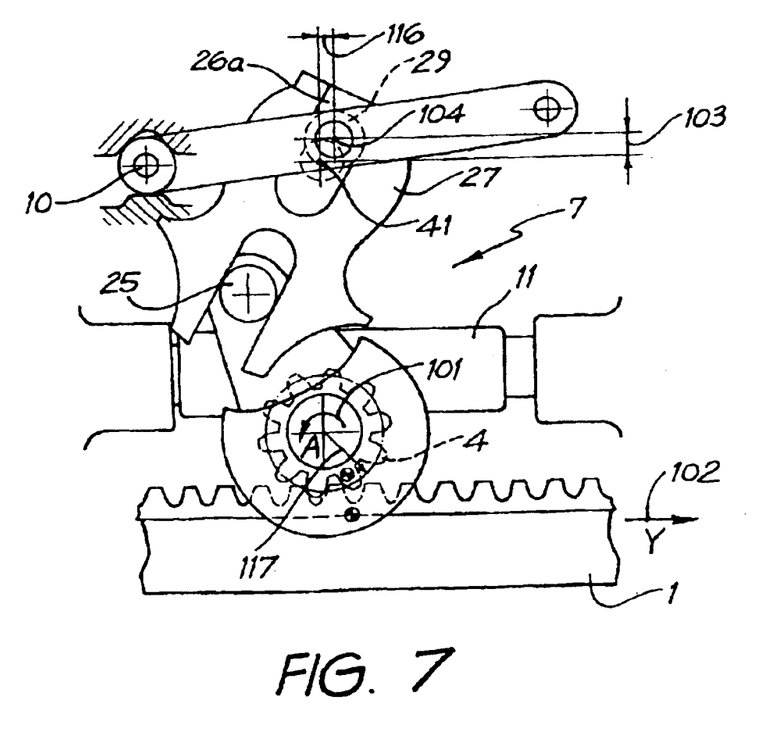

FIG. 7 shows the steering wheel angle 101 approximately halfway between the straight ahead driving position and geneva mechanism 7 disengaging position. Geneva drive pin 25 rotates geneva driven plate 27 about axis 41 in the opposite rotational direction to the steering wheel angle 101. Under normal driving conditions pivot 10 is laterally fixed so roller 29 is also essentially laterally fixed. Roller 29 remains engaged with slot 26a in geneva driven plate 27 causing geneva driven plate axis 41 to move by lateral displacement 116. Axis 41 is fixed to pinion carrier 11 so that pinion 4 is also laterally displaced by distance 116. Rack travel 102 is then the steering wheel angle 101 multiplied by the pinion pitch radius 117 minus distance 116.

This can be represented by the formula:

$$Y = (\theta \cdot r_p) - \Delta$$

Where
Y=rack travel 102
Γ=steering wheel angle 101
$r_p$=pinion pitch radius 117
Δ=lateral displacement 116

Therefore geneva mechanism 7 causes rack travel 102 to be less than it would otherwise be for the same amount of steering wheel angle 101 and hence the steering angle ratio is increased.

FIG. 8 shows steering wheel angle 101 such that geneva mechanism 7 is at the limit of engagement. FIG. 9 shows the maximum steering wheel angle possible. For steering angles between the positions shown in FIGS. 8 and 9 geneva driven plate 27 is rotationally fixed by locking plate sector 24 and hence the steering angle ratio is constant as represented by regions 110 on the graph shown in FIG. 5.

The steering angle ratio increases proportionally to the rate of change of lateral displacement (Δ) 116 with respect to steering wheel angle (θ) 101. This rate of change of lateral displacement 116 with respect to steering wheel angle 101 is essentially proportional to the change of rotation of geneva driven plate 27 with respect to steering wheel angle (θ) 101. This rate varies from zero at the limit of geneva mechanism engagement shown in FIG. 8 to a maximum at the straight ahead driving position shown in FIG. 6. Therefore the increase in steering angle ratio also varies from zero at the limit of Geneva mechanism engagement to maximum at the straight ahead driving position.

Varying distance 103 multiplies the increase in steering angle ratio. When distance 103 is maximum then the rate of change of lateral displacement (Δ) 116 to change of rotation of Geneva driven plate 27 is maximum and hence increase in steering angle ratio is maximum. Of course distance 103 may be further increased until distance 116 equals the distance travelled by the pinion carried when the mechanism is in the straight ahead position as in FIG. 6. At this position the steering angle is momentarily infinite.

In operation of the power steering gear, torque sensor 9 (FIG. 1) comprises either an electrical device which generates a signal according to the input torque applied to steering column 6. Typically a maximum signal is generated, calling for the required degree of output assist torque from electric motor 8. This torque required to produce the maximum output force at rack 1 under normal driving conditions is of the order of 10 Nm.

This torque is transmitted to pinion carrier 11 by pinion 4 which normally would cause speed lever 30 and pinion carrier 11 to move laterally as shown in FIG. 3, were it not for the action of detent device 33. This, however, is arranged to prevent such movement up to the input torque of 10 Nm, after which it yields to permit the pinion carrier 11 to move laterally until the pinion carrier 11 stops as at abutment 121.

Figure 11:
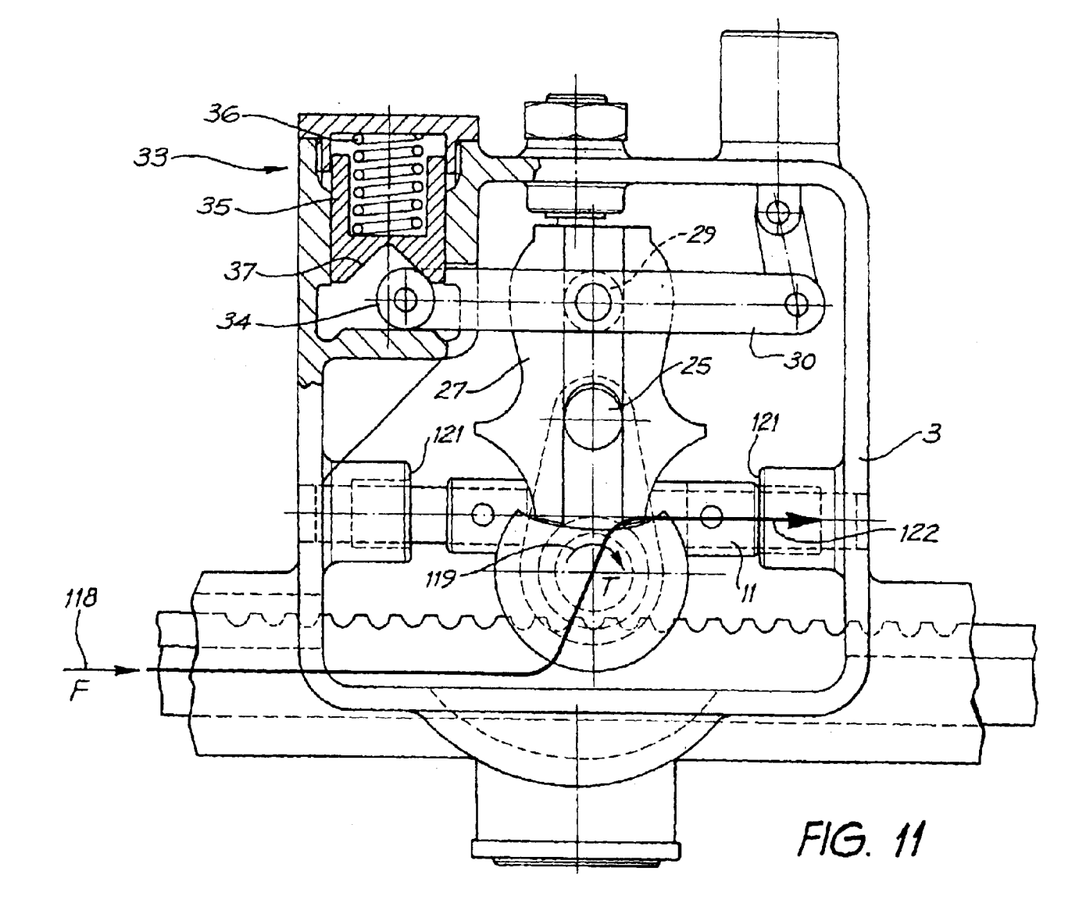
FIG. 11 is a similar cross sectional view to FIG. 2 with excessive loads on the steering gear being bypassed.

FIG. 11 shows the steering gear shown in FIG. 3 in a position where excessive load bypasses geneva mechanism 7 to protect it. The operation of detent device 33 will now be described with greater detail.

Under normal driving conditions the position of roller 34 is fixed by V-notch 37 and lateral loads in the mechanism are transmitted to speed lever 30 then to roller 34. When axial rack load 118 exceeds a pre-determined threshold that corresponds to a steering wheel torque 119 greater than required for normal driving conditions, plunger 35 is then pushed upwards by roller 34 and pinion carrier 11 moves laterally until it contacts housing 3 at abutment 121. Excessive axial rack load is then transmitted to housing 3 as shown by load path 122. Geneva drive pin 25, geneva driven plate 27, speed lever 30 and other components in the steering gear are then not subjected to this excessive axial rack load. The mechanism operates symmetrically to protect it from excessive axial rack loads in both directions.

The provision of detent device 33 to act as a bypass means to limit loads imposed on the geneva mechanism 7 is beneficial where very high torques are applied to the steering wheel, possibly well in excess of 100 Nm or applied to the rack of the same order by impact of the front wheels on a road pot-hole or kerb. Steering gear design specifications requires that steering gear be able to withstand test forces well in excess of the above.

Whilst the abovementioned embodiment describes a geneva mechanism 7 which creates a "predetermined transmission pattern" between the steering wheel angle and the small lateral movement of pinion carrier 11, this geneva mechanism 7 may be replaced by another mechanism which is able to create a similar predetermined transmission pattern. One such mechanism is a desmodromic cam mechanism.

Figure 12:
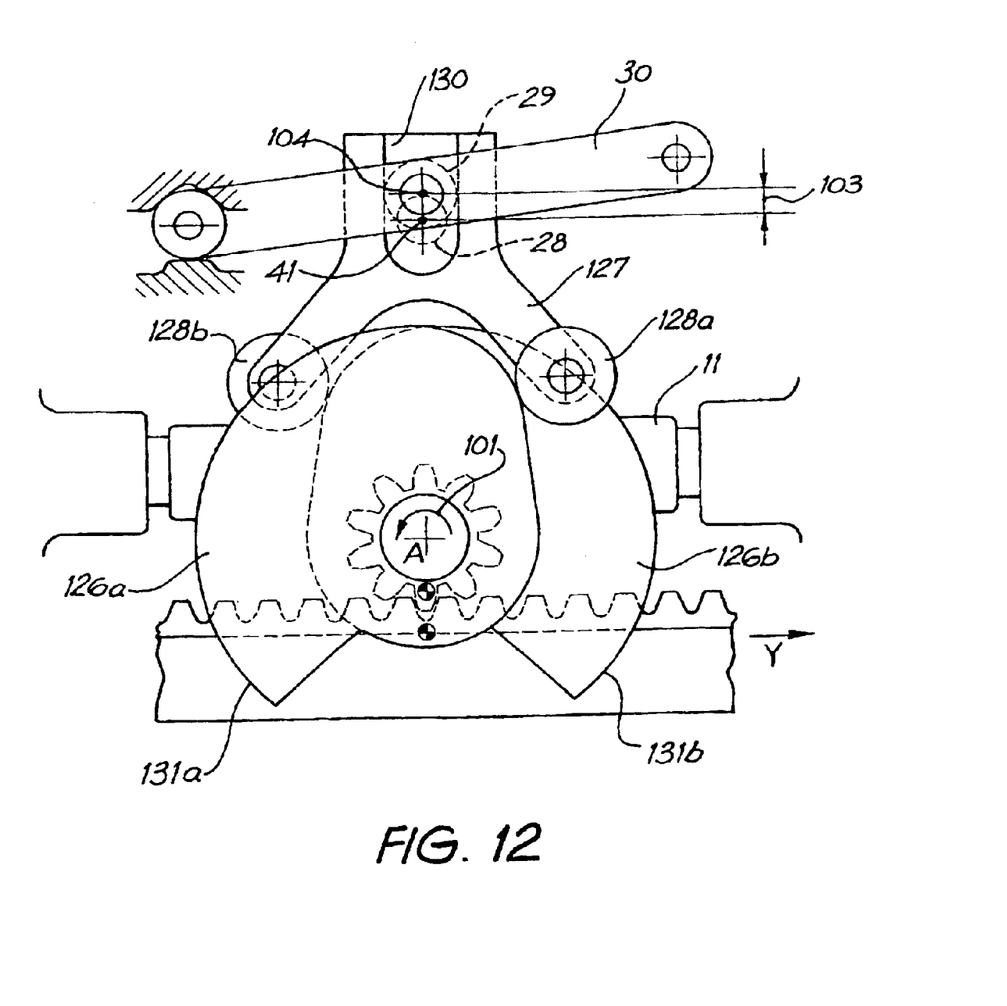
FIG. 12. is a simplified view of a desmodromic cam mechanism which replaces the geneva mechanism of the first embodiment shown in FIG. 2 in a second embodiment of the present invention.

FIG. 12 shows a simplified view of a second embodiment of a steering gear using a desmodromic cam mechanism instead of a geneva mechanism. The components of the steering gear that are not shown on FIG. 12 are the same as the steering gear shown in FIGS. 2 and 3.

Comparing the desmodromic cam mechanism shown in FIG. 12 with the simplified geneva mechanism shown in FIG. 4, desmodromic cams 126a and 126b replaces geneva drive pin 25 and locking plate sector 24, and follower arm 127 replaces geneva driven plate 27.

Pin 29 attached to speed lever 30 engages slot 130 formed in follower arm 127. Shaft 28 which projects from follower arm 127 is journalled in pinion carrier 11 about axis 41. Vertical distance 103 is the distance between axis 41 and axis 104 of pin 29. Distance 103, in a like manner to the first embodiment, is varied by servo motor 31 to incline speed lever 30 about pivot 10. Similarly, at high vehicle speed, distance 103 is greater than at low vehicle speed.

Roller 128a attached to follower arm 127 follows cam 126a and roller 128b follows cam 126b. Cams 126a and 126b rotate follower arm 127 a predetermined amount depending on steering wheel angle(θ) 101. Both cams 126a and 126b are used so that the rotation of follower arm 127 is always controlled without the need to force the rollers 128a and 128b on to the cam surface using a spring or the like. This arrangement using two cams to control the rotation of one follower arm is commonly known as a desmodromic cam mechanism.

Profiles 131a and 131b of cams 126a and 126b respectively are designed to give follower arm 127 a similar motion with respect to steering wheel angle (θ) 101, as geneva driven plate 27 in the first embodiment of the steering gear shown in FIG. 4. Outside central region 111 the cam profiles are designed to keep rotation of follower arm 127 fixed in a similar manner to fixing rotation of geneva driven plate 27 by locking plate sector 24 when geneva drive pin 25 disengages from slot 26. This means that the desmodromic cam mechanism shown in FIG. 12 gives a similar predetermined transmission pattern to that described for the first embodiment shown in FIG. 5.

Figure 13:
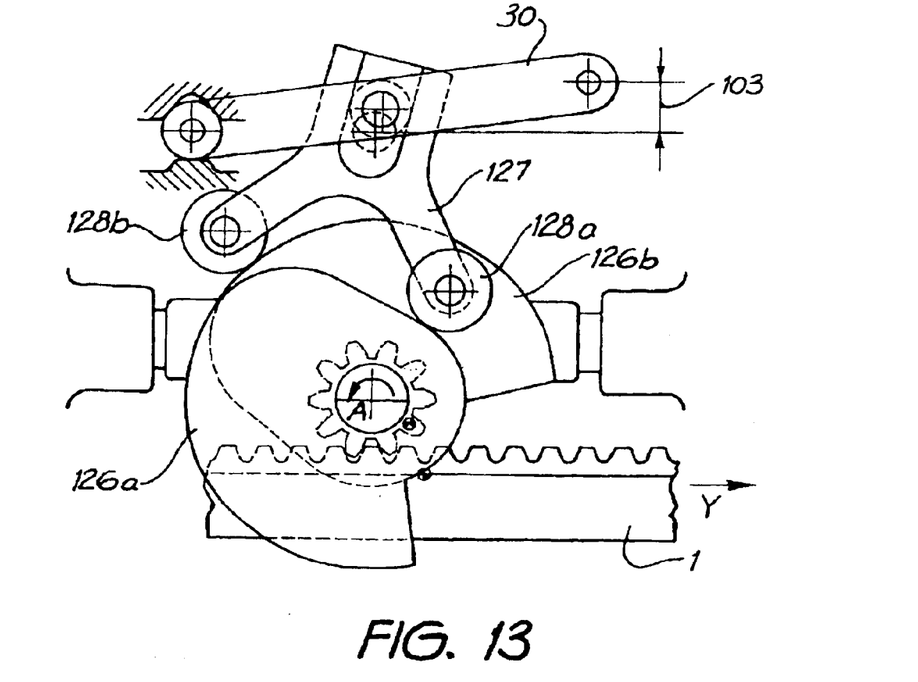
FIGS. 13 and 14 depict two positions of the desmodromic cam mechanism shown in FIG. 12.
Figure 14:
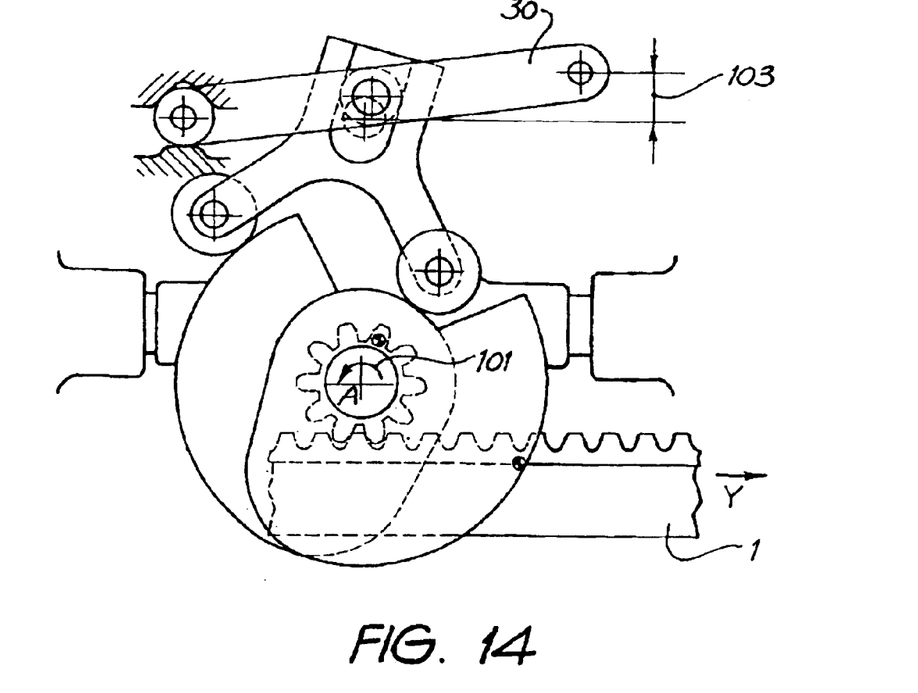

FIG. 13 shows the desmodromic cam mechanism at the limit of central region 111 and FIG. 14 shows the desmodromic cam mechanism at maximum steering wheel angle 101.

The term "steering wheel" as used herein includes any pivotal or rotatable driver steering input device.

It will be recognised by persons skilled in the art that numerous variations and modifications may be made to the invention without departing from the spirit and scope of the invention.

What is claimed is:

1. A rack and pinion steering gear for a vehicle, said vehicle having a variable speed and said steering gear having a steering angle ratio that varies as a function of at least both a steering wheel angle input provided by a driver and the speed of said vehicle, said steering gear comprising:
    a rack laterally displaceable with respect to a steering gear housing; and
    a pinion laterally moveable within said steering gear housing substantially in a direction of travel of said rack whilst engaged with said rack, and said steering angle ratio is increased in a central region of travel of said rack when compared to regions either side thereof, and said steering angle ratio is further increased in said central region as the speed of said vehicle increases.

2. A rack and pinion steering gear as claimed in claim 1, wherein said pinion is journalled for rotation within a pinion housing laterally movable within said steering gear housing substantially in the direction of travel of said rack, so subtracting from the travel of said rack and so minimizing the travel ratio therebetween by a variable amount, said amount decreasing with rotation of said pinion from a center straight ahead position and also decreasing with the speed of said vehicle.

3. A rack and pinion steering gear as claimed in claim 1, further comprising:
    first mechanical linkage means connected to said pinion to move said pinion in said steering gear housing in accordance with a predetermined transmission pattern operable in said central region of travel of said rack and disconnected therefrom in said regions either side thereof; and second mechanical linkage means connected to said first mechanical linkage means adapted to multiply said transmission pattern as a function of the speed of said vehicle to further increase said steering angle ratio in said central region.

4. A rack and pinion steering gear as claimed in claim 3, further comprising by-pass means connected to said second mechanical linkage means adapted to limit a first load transmitted through said first and second mechanical linkage means when a second load being transmitted from said pinion to said rack or vice versa exceeds a predetermined value.

5. A rack and pinion steering gear as claimed in claim 4, wherein said by-pass means comprises a detent mechanism connected to said steering gear housing.

6. A rack and pinion steering gear for a vehicle as claimed in claim 3, wherein said first mechanical linkage means comprises:
    a Geneva mechanism, having a first shaft rotatable with said pinion carrying a first pin of set from the axis of said first shaft, said first pin operable to engage a first radial slot in a member carried by a second shaft whose axis is parallel with and offset from the axis of the first shaft, a second radial slot in said member rotatable with said second shaft, and a second pin engaged in said second slot, fixed laterally with respect to said steering gear housing at a distance, with respect to the axis of said second shaft, that is variable in accordance with the speed of said vehicle.

7. A rack and pinion steering gear as claimed in claim 6, further comprising a lever pivoted with respect to said steering gear housing, said second pin being secured to said lever.

8. A rack and pinion steering gear as claimed in claim 6, wherein said vehicle includes:

detection means for detecting the departure of said vehicle from the directional course as indicated by said steering wheel angle input and in respect to the speed of said vehicle, said detection means providing an output signal to an actuator means in order to move said second pin laterally in said steering gear housing in response said output signal.

9. A rack and pinion steering gear as claimed in claim 3, wherein said first mechanical linkage means comprises a pair of desmodromic cams.

10. A rack and pinion steering gear for a vehicle, said vehicle having variable speed and at least one steerable road wheel having a road wheel angle, the steering gear controlling the road wheel angle as a function of at least a steering wheel angle input provided by a driver and the speed of the vehicle, the steering gear comprising:

a rack laterally displaceable in a fixed rack housing; and
  a pinion journalled for rotation in a pinion housing, the displacement of the rack in the rack housing determining the road wheel angle, and the rotation of the pinion in the pinion housing determined by the steering wheel angle, the instantaneous ratio between changes in the steering wheel angle and changes in the road wheel angle defining a steering ratio characteristic which varies as a function of the steering wheel angle and the speed of the vehicle,
  wherein the pinion housing is journalled for lateral displacement relative to the rack housing, and
  actuation means determines the lateral displacement of the pinion housing relative to the rack housing as a function of the magnitudes of at least the steering wheel angle and the speed of the vehicle, thereby determining the steering ratio characteristic.

11. A rack and pinion gear as claimed in claim 10, wherein the actuation means comprises a mechanical linkage, such that, when displacement inputs relating to the magnitude of the steering wheel angle and the speed of the vehicle are applied to the linkage, the linkage as a kinematic characteristic output to the rack which varies with the magnitude of the displacement inputs.

12. A rack and pinion steering gear as claimed in claim 11, wherein one or both of the displacement inputs are provided by an electric or hydraulic actuator.

13. A rack and pinion steering gear as claimed in claim 11, wherein the mechanical linkage comprises a pin-and-slot mechanism.

14. A rack and pinion steering gear as claimed in claim 11, wherein the mechanical linkage comprises a cam-and-follower mechanism.

15. A rack and pinion steering gear as claimed in claim 11, wherein mechanical linkage comprises a spring loaded element which provides compliance to the mechanical linkage during high load conditions, thereby protecting the mechanical linkage from damage during these conditions.

16. A rack and pinion steering gear as claimed in claim 11, wherein the actuation means determines the lateral displacement of the pinion housing relative to the rack housing also as a function of an additional input which is independent of the steering wheel angle input provided by the driver.

17. A rack and pinion steering gear as claimed in claim 10, wherein the actuation means is a hydraulic or electric actuator.

18. A rack and pinion steering gear as claimed in claim 10, wherein the steering ratio characteristic provides a steering ratio in a center operating region of the steering gear associated with on-center driving which is greater, by a given maximum increment, than the steering ratio provided in the other operating regions of the steering gear either side of the center operating region.

19. A rack and pinion steering gear as claimed in claim 18, wherein the increment increases in magnitude as the speed of the vehicle increases.

20. A rack and pinion steering gear as claimed in claim 18, wherein the increment is zero or negative when the speed of the vehicle is low.

* * * * *